United States Patent [19]

Lefevre

[11] Patent Number: 4,865,449
[45] Date of Patent: Sep. 12, 1989

[54] OPTICAL SIGNAL REJECTION FILTER AND APPLICATION OF SAID FILTER TO RING INTERFEROMETERS

[75] Inventor: Hervé Lefevre, Paris, France

[73] Assignee: Thomson-CSF, Paris, France

[21] Appl. No.: 166,493

[22] Filed: Mar. 10, 1988

[30] Foreign Application Priority Data

Mar. 13, 1987 [FR] France .................................. 87 03460

[51] Int. Cl.$^4$ .............................................. G01B 9/02
[52] U.S. Cl. ..................................... 356/345; 356/350
[58] Field of Search ................................. 356/345, 350

[56] References Cited

U.S. PATENT DOCUMENTS 4,759,627 7/1988 Thylen et al. ....................... 356/345

FOREIGN PATENT DOCUMENTS 30891 6/1981 European Pat. Off. .

OTHER PUBLICATIONS

French Search Report—FR 8703460, 11-12-1987.

Primary Examiner—Davis L. Willis
Assistant Examiner—Matthew W. Koren
Attorney, Agent, or Firm—Oblon, Spivak, McClelland, Maier & Neustadt

[57] ABSTRACT

An optical signal rejection filter has a beam separator giving light waves with two different transmission devices and with different propagation times. Optoelectronic detectors receive these waves and give equivalent electrical signals to a differential amplifier which gives a signal representing the difference between the signals received. This filter can be used, preferably, in ring interferometers.

6 Claims, 2 Drawing Sheets

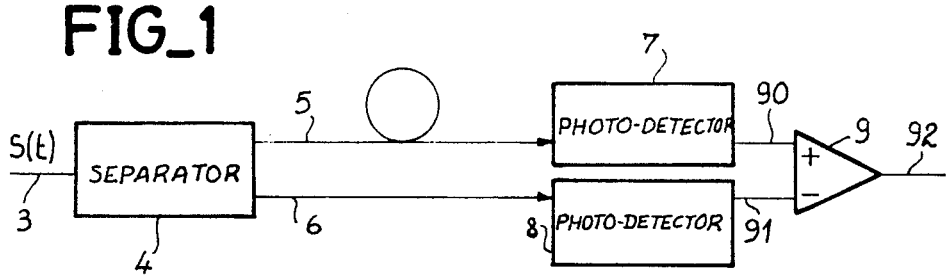
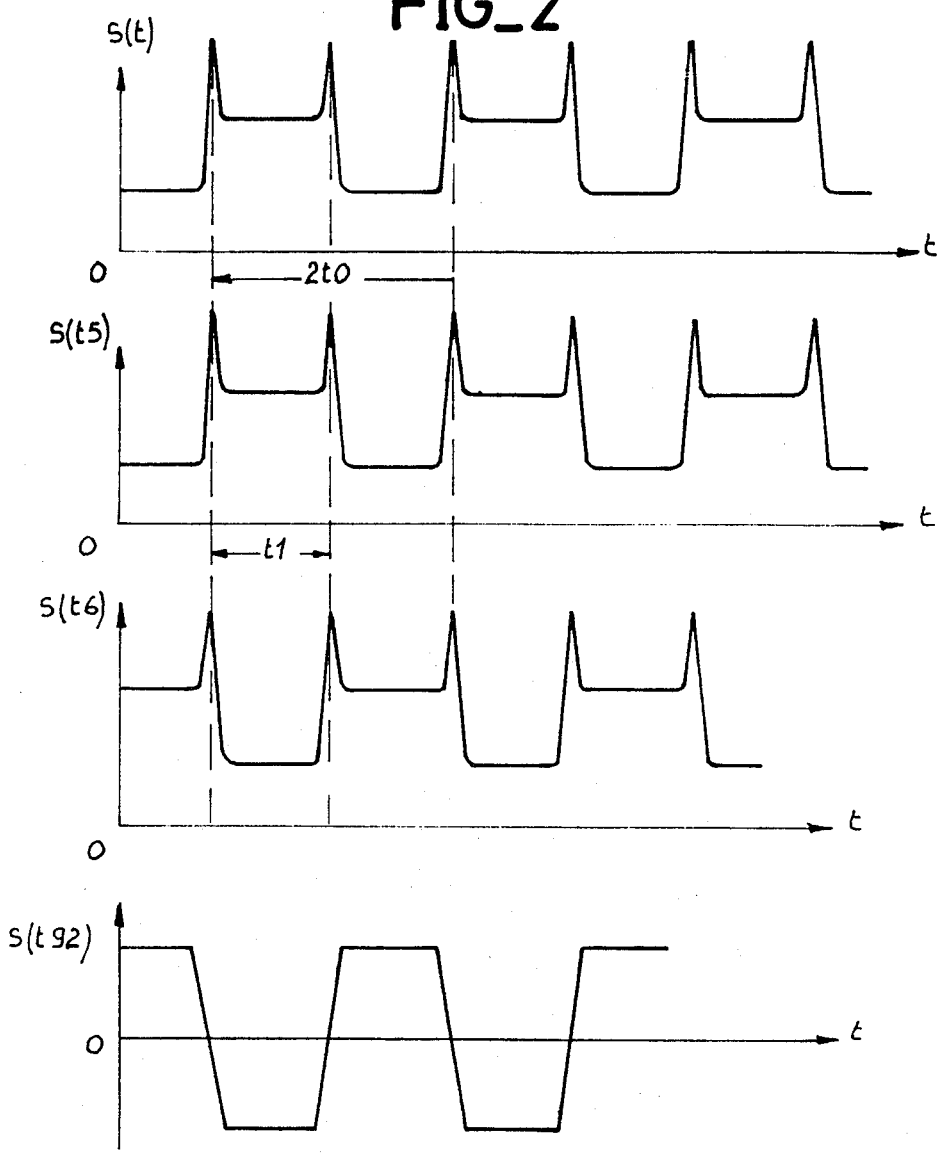

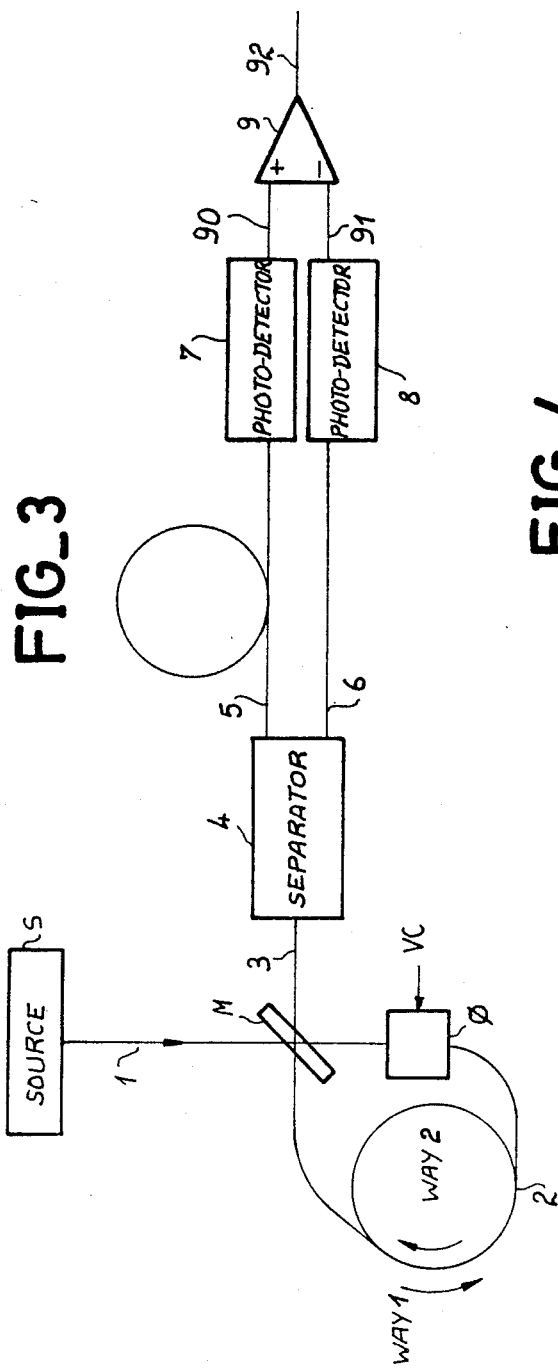
FIG_3
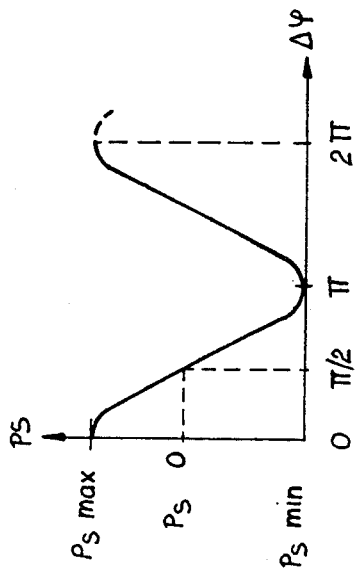
FIG_4

OPTICAL SIGNAL REJECTION FILTER AND APPLICATION OF SAID FILTER TO RING INTERFEROMETERS

BACKGROUND OF THE INVENTION

1. Field of the Invention

The invention relates to an optical signal rejection filter which can be used, in particular, to reject the even frequencies and retain the odd frequencies of an optical signal consisting of the various harmonics of a fundamental frequency. The invention also relates to an application of a filter of this type to ring interferometers.

The frequency filtering of optical signals raises problems which, depending on the techniques concerned, are resolved only by standard electronic methods.

The invention proposes a filter which can be used to eliminate even frequencies with certainty by associating a combination of optical devices with an electronic amplifying circuit.

This filter is more especially applicable to ring interferometers, more particularly, to interferometers having, in a branch of the ring-shaped waveguide of the interferometer, a phase modulation device which can detect, with high sensitivity, a phase shift between two counter-rotating waves that travel through the ring of the interferometer.

2. Description of the Prior Art

An interferometer of a known type has mainly a source of light energy generally consisting of a laser; an optical device consisting of either a number of mirrors or of an optic fiber wound on itself, this optical device forming a waveguide; a device for separating and mixing light and a device for the detection and processing of the signal detected.

Examples of descriptions of interferometers of this type will be found in the French patent applications:

No. 2 471 583 filed on Dec. 14th 1979,
No. 2 566 133 filed on June 14th 1984.

It is known that, in these interferometers, there are two waves that come from the separating device and travel along the same optical path in opposite directions.

Disturbances or magnitudes to be measured are represented by phase shifts in the waves, and it is possible to measure a phase difference between two waves.

To measure low-amplitude disturbances causing minor phase differences, the French patent No. 2.471.583 has proposed a phase modulation, of alternately $+\pi/2$ radian and $-\pi/2$ radian, of the waves propagated in the ring.

Since a phase modulation is produced at one end of the fiber loop, one of the waves undergoes the modulation at the instant when it is produced, while the other wave undergoes the modulation with a delay equal to the propagation time in the fiber. This propagation time satisfies the following relationship:

$t_o = nl/c$, where n is the equivalent refractive index of the fiber, l is the length of the fiber and c is the speed of light in vacuum. The natural frequency of the interferometer is ($\frac{1}{2}t_o$), and represents the modulation frequency at which the two waves undergo their respective phase shifts in phase opposition. The phase shift between the two optical waves is therefore equal to the difference $s(t) - s(t - t_o)$, where S(t) is the signal applied to the phase modulator. It can therefore be seen that if the half period of the modulation signal is $t_o$, the phase shift at the output of the interferometer is equal to twice the phase shift applied. This is the method used to create the slant that gives the functioning point of the interferometer.

To this phase shift, there is added a phase shift $\Delta \oplus \phi_o$ due to an effect to be measured. The signals can be used directly, and the component in $\sin\Delta\phi_o$, carried by the odd harmonics, can be measured. However, there are even harmonics which are difficult to eliminate.

The filter of the invention, applied to an ring interferometer, can eliminate these even harmonics with certainty.

SUMMARY OF THE INVENTION

The invention relates to an optical signal rejection filter having a transmission channel for a power modulated optical signal, said filter also including:

a beam separator receiving said modulated optical signal and giving, at a first output and a second output, a first part and a second part of this modulated optical signal;

a first optical transmission device having a first propagation time, connected by a first end to the first output of the beam separator and transmitting the first part of the optical signal;

a second optical transmission device having a second propagation time, connected by a first end to the second output of the beam separator and transmitting the second part of the optical signal;

a first optoelectronic detector connected to a second end of the first optical transmission device, said detector detecting the intensity of the first part of the optical signal transmitted by this end and giving, in exchange, a first electrical signal at an output;

a second optoelectronic detector connected to a second end of the second optical transmission device, said detector detecting the intensity of the second part of the optical signal transmitted by this end and giving, in exchange, a second electrical signal at an output;

a differential amplifier having a first input that receives the first electrical signal, a second input that receives the second electrical signal, with an output giving a signal representing the difference between the two electrical signals received.

The invention also relates to a ring interferometer including:

a light source;

an interferometrical waveguide having two ends;

interference photodetectors for the two light waves;

optical separating and mixing devices which couple the waveguide ends optically to the light source and to the photodetectors;

electrically-controlled optical phase shifting devices associated with the waveguide, said devices acting on the light waves that flow through the waveguide;

an oscillator for the control of the optical phase shifting devices giving electrical signals with a period equal to the time taken by an optical wave, given by the source, to travel through the interferometrical waveguide; wherein the interference photodetectors have a filter for which the difference between the propagation times of the two transmission devices is equal to the time taken by an optical wave, coming from the source, to travel through the interferometer waveguide.

BRIEF DESCRIPTION OF THE DRAWINGS

The various objects and features of the invention will appear more clearly in the following description made with reference to the appended figures, of which:

FIG. 1 shows an embodiment of a filter according to the invention;

FIG. 2 is an example of a graph showing the working of the filter of FIG. 1;

FIG. 3 shows an embodiment of a ring interferometer in which the filter according to the invention is used;

FIG. 4 is a curve that illustrates the working of the interferometer of FIG. 3.

DETAILED DESCRIPTION OF THE INVENTION

Referring to FIG. 1, we shall first describe an embodiment of a filter according to the invention.

This filter has an optical guide 3 that transmits a light signal s(t). A beam separator 4 receives this light signal and divides it into two parts. This separator has two outlets to which two guides 5 and 6 are connected. Through each optical guide, the separator sends a light wave corresponding to a part of the light signal S(t). The optical guide (5) then transmits a wave S(t5) and the optical guide transmits a wave S(t6). One of the optical guides 5 or 6 has devices which can be used to give a delay t1 to the light wave that it transmits. For example, according to the embodiment of FIG. 1, the optical guides 5 and 6 are made with optical fibers. To cause this delay t1, the optic fiber 5 is longer than the fiber 6. The extra length of the fiber 5 constitutes a delay line, the delay time t1 of which depends on the difference in length between the fibers.

For example, if the signal S(t) has the form represented by the curve S(t) of FIG. 1, with a period having a value 2t0, the delay t1 should be such that the two light waves, after transmission by the optic guides 5 and 6, are delayed by a half period. The delay t1 provided by the guide should be equal to t0.

Each optic guide 5 and 6 has photodetectors 7 and 8 connected to it. These photodetectors detect the intensity of the light waves S(t5) and S(t6) transmitted by the guides 5 and 6. Each photodetector gives, in exchange, an electrical signal of the same form as the light wave that it receives. These electrical signals are applied to the inputs 90 and 91 of a differential amplifier 9. The differential amplifier 9 therefore receives two electrical signals with the form represented by the curves S(t5) and S(t6) of FIG. 2.

The amplifier 9 takes the difference between the two signals received at both these inputs 90 and 91. At its output 92, the amplifier 9 gives a signal S(t92) and thus eliminates the power peaks, affecting the input signals in the same way.

It can thus be seen that an input light signal S(t), after being separated into two light waves, is transmitted to photodetectors with a wave time-shifted by a half period, in phase opposition with respect to the other wave. A differential amplifier takes the difference between the signals detected. This subtraction eliminates the peaks. This is a useful because it is known that peaks of this type have the disadvantage of saturating the pre-amplifiers.

A filter of this type rejects the odd frequencies of the 2n/2 t1 type where n is a whole number equal to or greater than zero, and lets through the odd frequencies of the 2n+1/2 t1 type.

The two photodectors may be made on one and the same substrate. This substrate may be made of silicon, for example, for light wavelengths of about 0.8 to 0.85 micrometers. The manufacturing of two photodetectors on one and the same substrate, in common rejection mode, facilitates the elimination of unwanted electrical signals.

FIG. 2 illustrates an operation by means of a signal S(t) which is substantially rectangular, because this type of operation is easier to understand and to describe. However, the same filter works in sinusoidal mode and can be used to eliminate even harmonics.

A great advantage of a filter of this type is that it does not introduce any phase shift unlike standard electrical band-pass filters.

This filter is perfectly suited to a fiber ring interferometer using the standard method of phase modulation to obtain a signal substantially around zero. For a frequency f phase modulation is applied to an end of the coil, and it is sought to detect the odd frequencies $(2n+1)f$.

Since this filtering eliminates the even frequencies, it is very useful for limiting the range of the signal, which will drive the input amplifier of the demodulation stage, to the frequency f.

Referring to FIG. 3, we shall now describe an application of the filter of the invention to a ring interferometer.

A laser source S produces a beam of parallel rays 1, sent to a separating device consisting, for example, of a strip or a semi-transparent mirror M which is optically coupled to the ring 2 of the interferometer. This ring 2 can be made, for example, with a monomode optic fiber wound on itself. For the sensitivity of the measurement is increased through the use of an optical path of a length proportionate to the number of turns. This ring 2 is looped back on the separating device M which also acts as a mixing device and thus defines an output branch 3. The ring thus has two waves travelling through it, propagated in opposite directions, one clockwise (direction 2) and the other, anti-clockwise (direction 1).

These two waves are re-combined at the separating strip M. The result of this re-combination can be seen in the output branch 3. This branch 3 is connected to a filter such as the one described with respect to FIG. 1. Hence, the beam separator 4, the waveguide 5 and 6, the photodetectors 7 and 8 and the differential amplifier 9 are seen again in this FIG. 3, connected to the branch 3.

Let be the phase difference between the two waves propagated in opposite directions in the ring, and let PS be the output option power which can be measured in the output arm 3. In the absence of "non-reciprocal" disturbance, $\Delta\phi_o$ is nil.

If we take a non-restrictive example of a gyrometer using a ring interferometer, a non-reciprocal disturbance will be created by the rotation of the gyrometer. The phase difference is no longer zero and we get $\Delta\phi_o = \Omega$ where $\Omega$ is the rotational speed, and $\alpha = K L/\lambda C$ where k is a constant depending on the geometry of the gyrometer, L is the optical path, $\lambda$ is the wavelength of the light emitted by the laser source S and C is the speed of light in vacuum. When the rotational speed increases, the phase difference $\Delta\phi_o$ increases in the same proportion for the coefficient o remains constant. The optic power $P_S$ changes according to a cosinusoidal relationship. For:

$$P_S = P_{1S} + P_{2S} + 2P_{1S}P_{2S}\cos(\Delta\phi_o);$$

a relationship in which the component $P_{1S}$ corresponds to the direction 1 and the component $P_{2S}$ corresponds to the direction 2. This dependence on $\cos\Delta\phi_o$ leads to zero sensitivity in the idle position (without rotation). The system must be placed slantwise to obtain dependence on $\sin\Delta\phi_o$.

For this, as pointed out in the French patent No. 2.471.583, a phase modulator, bringing a reciprocal effect into play, is introduced into the path of the waves in the ring 2. This modulator $\phi$ (FIG. 3) is excited so as to create a phase variation $\phi(t)$ in the wave that goes through it. This variation is periodic, its period being equal to $2t_o$, where $t_o$ is the time taken by a wave to travel through the ring.

The phase difference then becomes:

$$\Delta\phi' = \Delta\phi_o + \phi(t) - \phi(t-t_o)$$

where each of the waves circulating in opposite directions undergoes this phase shift when it goes through the modulator with $$\phi(t) = \phi(t+2t_o)$$

The phase shift signal applied may advantageously be a reciprocal phase shift signal with a rectangular form.

We then get, in the branch 3, an interference signal $S(t)$ of the form shown in FIG. 2.

When there is no disturbance, the two waves moving in the direction 1 and the direction 2 undergo no phase shift except that imposed by the circuit $\phi$ and the signal $S(t)$ has equal levels in each half period $t_o$. On the contrary, when there is a phase shift $\Delta\phi$, the levels are different in each half period of the signal $S(t)$ as shown in FIG. 2.

According to the invention, the delay provided by the waveguide 5 with respect to the waveguide 6 is such that the two waves, $S(t5)$ and $S(t6)$, are put in phase opposition. The delay $t1$ is therefore equal to the half period $t_o$. Since this half period $t_o$ is, as specified earlier, equal to the time taken by a wave to travel through the ring 2, the delay $t1$ should also be equal to this travelling time.

In an embodiment of the waveguides 5 and 6 using optic fibers, the optic fiber 5 has, according to the invention, a ring (or optic fiber coil) with a length equal to that of the fiber forming the interferometer ring 2. Thus, if the fiber 5 is made of the same material as the interferometer ring, the delay $t1$ provided by the fiber 5 is really equal to the time taken by a wave to travel through the interferometrical ring and is, therefore, equal to the half period $t_o$.

For example, for a 200-meter interferometer ring (hence one where the fiber 5 is 200 meters long), there will be a delay of 1 $\mu s$ and the modulation frequency will be 500 kHz.

In an application of this type, while it is suitable for the fiber 2 of the interferometer ring to have a polarization-maintaining monomode fiber, this does not have to be so for the fiber 5. For the latter may be a multiple-mode fiber since the pass-band is amply sufficient at these operating frequencies.

Furthermore, the quality of rejection of the even harmonics is equal to the balancing of the two optical channels (5 and 6) of the filter, and it is quite possible to envisage a ratio of $10^{-2}$ to $10^{-3}$.

Finally, the use of two detectors, $D_1$ and $D_2$, mounted on the same substrate and connected in common mode rejection also helps eliminate unwanted electrical signals caused by external electrical fields, in particular, modulation fields. It may be recalled that the product of the fundamental frequency transmitted f and the length of the delay line L is in the range of 100 MHz. Furthermore, this filter can be used to maintain operation in phase gradient and to control the fall-back to $2\pi$ as described in the French patent No. 2.566.133.

It is obvious that the above description has been given only as an example and that other alternatives can be envisaged without going beyond the scope of the invention. The digital values and forms of the signals, in particular, have been given only to illustrate the description.

What is claimed is:

1. An optical signal rejection filter having a transmission channel for a power modulated optical signal, said filter including:
    a beam separator receiving said modulated optical signal and giving, at a first output and a second output, a first part and a second part of this modulated optical signal;
    a first optical transmission device having a first propagation time, connected by a first end to the first output of the beam separator and conducting the first part of the optical signal;
    a second optical transmission device having a second propagation time different than said first propagation time, connected by a first end to the second output of the beam separator and conducting the second part of the optical signal;
    a first optoelectronic detector connected to a second end of the first optical transmission device, said detector detecting the intensity of the first part of the optical signal transmitted by this end and giving, in exchange, a first electrical signal at an output;
    a second optoelectronic detector connected to a second end of the second optical transmission device, said detector detecting the intensity of the second part of the optical signal transmitted by this end and giving, in exchange, a second electrical signal at an output;
    a different amplifier having a first input that receives the first electrical signal, a second input that receives the second electrical signal, with an output giving a signal representing the difference between the propagation times of the first and second optical transmission devices.

2. A rejection filter according to claim 1 wherein the first optical transmission device has a first optic fiber and wherein the second optical transmission device has a second optic fiber.

3. A rejection filter according to claim 2 wherein the first optic fiber has a length different from that of the second optic fiber.

4. A rejection filter according to claim 1 wherein the first and second detectors are integrated in the same substrate.

5. A ring interferometer including:
    a light source;
    an interferometrical waveguide having two ends each of which is coupled to the light source to receive respective of two light waves which are transmitted in opposite directions through the waveguide;
    interference photodetectors for the two light waves emerging from the two ends of the waveguide;
    optical separating and mixing devices and two transmission devices having different light propagation times, said optical separating and mixing device coupling the waveguide ends optically to the light source and said two transmission devices coupling said waveguide ends to the photodetectors;

electrically-controlled optical phase shifting devices associated with the waveguide, said devices acting on the light waves that flow through the waveguide;

an oscillator for the control of the optical phase shifting devices giving electrical signals with a period equal to the time taken by an optical wave, given by the source, to travel through the interferometrical waveguide; wherein the interference photodetectors have a filter wherein the difference between the propagation times of the two transmission devices equal to the time taken by an optical wave, coming from the source, to travel through the interferometer waveguide.

6. A ring interferometer according to claim 5 wherein, since the two transmission devices as well as the waveguide of the interferometer are optic fibers, of the same nature, the difference in length between these fibers is equal to the length of the waveguide of the interferometer.

* * * * *